(12) United States Patent
Satoh

(10) Patent No.: US 7,752,445 B2
(45) Date of Patent: Jul. 6, 2010

(54) SYSTEM AND METHOD FOR AUTHENTICATION OF A HARDWARE TOKEN

(75) Inventor: Masakazu Satoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 11/063,095

(22) Filed: Feb. 22, 2005

(65) Prior Publication Data

US 2006/0005011 A1 Jan. 5, 2006

(30) Foreign Application Priority Data

Feb. 27, 2004 (JP) ............... 2004-052835

(51) Int. Cl.
*H04L 29/00* (2006.01)
*H04L 9/32* (2006.01)
*G06F 12/14* (2006.01)

(52) U.S. Cl. ............... 713/173; 713/156; 713/168; 713/172; 726/9; 726/20

(58) Field of Classification Search ............... 713/173, 713/156, 168, 172; 726/9, 20
See application file for complete search history.

(56) References Cited

U.S. PATENT DOCUMENTS

| | | | |
|---|---|---|---|
| 5,307,411 A * | 4/1994 | Anvret et al. ............... 713/169 |
| 5,315,657 A * | 5/1994 | Abadi et al. ............... 726/4 |
| 5,544,246 A | 8/1996 | Mandelbaum et al. |
| 5,701,343 A * | 12/1997 | Takashima et al. ............... 705/51 |
| 6,834,795 B1 * | 12/2004 | Rasmussen et al. ............... 235/380 |
| 6,983,364 B2 * | 1/2006 | Gougeon ............... 713/2 |
| 6,988,250 B1 * | 1/2006 | Proudler et al. ............... 716/1 |
| 6,990,471 B1 * | 1/2006 | Rajaram ............... 705/64 |
| 7,036,738 B1 | 5/2006 | Vanzini et al. |
| 7,069,440 B2 * | 6/2006 | Aull ............... 713/175 |
| 7,275,160 B2 * | 9/2007 | Pearson et al. ............... 713/172 |
| 2003/0037264 A1 * | 2/2003 | Ezaki et al. ............... 713/202 |
| 2004/0031856 A1 | 2/2004 | Atsmon et al. |

FOREIGN PATENT DOCUMENTS

JP PUPA 11-219421 8/1999

(Continued)

OTHER PUBLICATIONS

Ng, et al., RSAM: Novel JavaCard-based Authentication System for Secured Transactions on the Internet, 2000, IEEE, pp. 1-6.*

(Continued)

*Primary Examiner*—Kambiz Zand
*Assistant Examiner*—William S Powers
(74) *Attorney, Agent, or Firm*—Yee & Associates, P.C.; Arthur J. Samodovitz

(57) ABSTRACT

Authentication of a hardware token connected to a computer includes storing, in the hardware token, a computer public key Ck generated in the computer; reading out, from the hardware token to the computer, a user public key Uk, registering the user public key Uk from the computer with a certificate authority, and receiving a certificate issued from the certificate authority with respect to the user public key Uk, and storing the issued certificate for the user public key Uk in the hardware token.

16 Claims, 12 Drawing Sheets

FOREIGN PATENT DOCUMENTS

| | | |
|---|---|---|
| JP | PUPA 2002-279390 | 9/2002 |
| JP | PUPA 2002-281025 | 9/2002 |
| JP | PUPA 2002-312325 | 10/2002 |
| JP | PUPA 2002-536757 | 10/2002 |
| JP | 2003-044436 | 2/2003 |
| JP | PUPA 2003-036023 | 2/2003 |
| JP | PUPA 2003-092565 | 3/2003 |
| JP | 2003-115841 | 4/2003 |
| JP | PUPA 2003-298574 | 10/2003 |
| JP | PUPA 2003-316461 | 11/2003 |
| JP | PUPA 2004-038270 | 2/2004 |
| WO | 0048063 | 8/2000 |
| WO | 02/056155 A2 | 7/2002 |

OTHER PUBLICATIONS

Wong et al., Efficient and Mutually Authenticated Key Exchange for Low Power Computing Devices, 2001, Springer-Verlag, ASIASCRYPT 2001, pp. 272-289.*

Young, A Weakness in Smart Card PKI Certification, 2003, IEEE, pp. 30-34.*

Schneier, Applied Cryptography, 1996, John Wiley and Sons, pp. 53-54.*

Satoh, Yoshio; "Personal Authentication with IC Card;" Unisys Techonology Review No. 73, May 2002 (p. 137-139).

Summary of JP Examiner Cited Art.

* cited by examiner

SYSTEM AND METHOD FOR AUTHENTICATION OF A HARDWARE TOKEN

CROSS REFERENCE TO RELATED APPLICATIONS

Priority is claimed of related Japan Patent Application JP2004-052835, filed 27 Feb. 2004.

FIELD OF THE INVENTION

The present invention relates to the authentication of a person in question and, more particularly, to an authentication method using a hardware token such as an Integrated Circuit (IC) card.

BACKGROUND ART

In recent years, electronic commerce activities in companies for example have increased and there have been rapidly increasing tendencies to protect personal information in companies.

For example, leakage of personal information from a company leads to a considerable loss of social trust in the company, including loss of confidence in company management.

On the other hand, hiring of temporary employees and outsourcing of operations have become prevalent in companies, and the kinds of persons accessing intra-company networks for example and the forms of access to such networks have been diversified. As a result, even in the case of an intra-company network, it is difficult to maintain a computer system in a secure state if only conventional user identifiers (IDs) and passwords are used.

A high level of security is also required, for example, in settlement systems, various management systems in the field of education, public systems related to administrative offices, taxation businesses, distribution systems using electronic money for example, as well as in intra-company systems. Under these circumstances, techniques for individual authentication using hardware tokens typified by IC cards have been adopted to cope with menaces such as "eavesdrop", "falsification" and "spoofing".

FIGS. 12(*a*) and 12(*b*) are diagrams for explaining a conventional password authentication method using an IC card. FIG. 12(*a*) shows processing at the time of installation of a certificate, and FIG. 12(*b*) shows processing at the time of use of the certificate. In the figures are illustrated a computer (PC) 201 which accesses a remote access unit (not shown) via a network such as the Internet, and an IC card 202 connected to the computer 201 by being inserted in an IC card reader/writer for example. A certificate authority 203 connected to the computer 201 via the Internet is also illustrated.

Referring to FIG. 12(*a*), in the conventional password authentication method, in phase 1, a password (PIN (personal identity number) code) is first set in IC card 202 from computer 201 at the time of installation (also referred to as personalization or initialization) of a certificate. In phase 2, a public key and a secret key combination is created and stored in IC card 202. Thereafter, in phase 3, computer 201 reads out the public key from the IC card 202. In phase 4, computer 201 makes application to certificate authority 203 for enrollment of the public key. In phase 5, certificate authority 203 issues a certificate for this public key to computer 201. In phase 6, computer 201 stores the public key certificate obtained from certificate authority 203 in IC card 202.

Referring to FIG. 12(*b*), use of the certificate is as follows. In phase 1, IC card 202 is connected to computer 201 and the password is input through computer 201. In phase 2, verification of the password is performed in IC card 202, and in the case where the correct password is input, a reply "OK" indicating that the password is correct is output from the IC card 202 to the computer 201. Password input and verification, or collation, performed in this manner enables authentication that a person who has accessed computer 201 by inserting IC card 202 in the IC card reader/writer and has entered a password is an authorized person. Thereafter, in phase 3, readout of the public key, and in phase 3', authentication with the secret key and so on, are performed between computer 201 and IC card 202.

Heretofore, a method for implementing individual authentication using a certificate stored in an IC card has been proposed (see, for example, Yoshio Sato, "Individual Authentication by Smart Card" UNISYS TECHNOLOGY REVIEW No. 73, May 2002 (pp 137-139). Sato proposes various approaches for realizing authentication of individuals in order to prevent unauthorized access. That is, Sato proposes prevention of use of an IC card by an unauthorized person, prevention of an unauthorized person from using an IC card, prevention of stealing of a secret key, early detection of unauthorized use, measures to be taken after detection, measures to be taken when an IC card is unusable, and so forth.

In the individual authentication method shown in FIGS. 12(*a*) and 12(*b*), an IC card 202 is used to store a digital certificate for a user public key and a corresponding secret key. The combination of the digital certificate and the secret key stored in the IC card 202 is used for authenticating a user when a connection is made to a private network from a remote base or the like by using a VPN (virtual private network) or the like. Conventionally, this is not a method in which a certificate is incorporated in a Web browser on computer 201, but rather is a method in which a certificate is stored in a hardware token such as IC card 202 which can be carried as a "key" (that is, a hardware token) for operating an individual authentication device.

However, there exists a risk that a hardware token such as IC card 202 may be lost or stolen. To address this risk, conventionally, a password is required to access to a hardware token, thus protecting the token from being used or accessed by a third person obtaining the hardware token.

However, a password is not a sufficiently sturdy protection means because it may be stolen, such as through a furtive glance when input by a legitimate user, or may be compromised or leaked by the legitimate user in a note or otherwise. If a smart card is protected against access only by using a password, a security exposure remains. These problems are posed by Sato (supra), and solutions proposed, such as "not to leave on a desk", "not to use a PIN using the date or birth or the like", "to enable early detection of unauthorized use by indicating the login date". These solutions fall far short of being adequate for the purpose of preventing unauthorized use.

There is, therefore, a need in the art for a system and method for improving the security level a hardware token such as an IC card used for authentication.

There is, further, a need in the art for an improved device for enabling a hardware token to be used only in a particular computer.

There is, further, a need in the art for enabling a hardware token to be used only in one or more computers certificated by a particular certificate authority.

It is, therefore, an object of the present invention to provide a hardware token, such as an IC card, having a markedly improved level of security against unauthorized access.

SUMMARY OF THE INVENTION

A system, method, and computer program product are provided for authenticating use of or access to a hardware token using a combination of a digital certificate and a secret key, including storing a computer public key Ck for a computer in the hardware token; storing a user public key Uk in the hardware token; reading out from the hardware token and storing in the computer the user public key Uk; registering the user public key Uk from the computer with a certificate authority; receiving from the certificate authority and storing in the computer a certificate issued with respect to the user public key Uk; and storing the certificate for the user public key Uk in the hardware token.

DETAILED DESCRIPTION OF THE PREFERRED EMBODIMENTS

A main feature of the present invention resides in the use of combination of a digital certificate and a secret key to authenticate use of or access to a hardware token.

Two exemplary embodiments of the present invention will be described with reference to the accompanying drawings.

Embodiment 1

Figure 1:
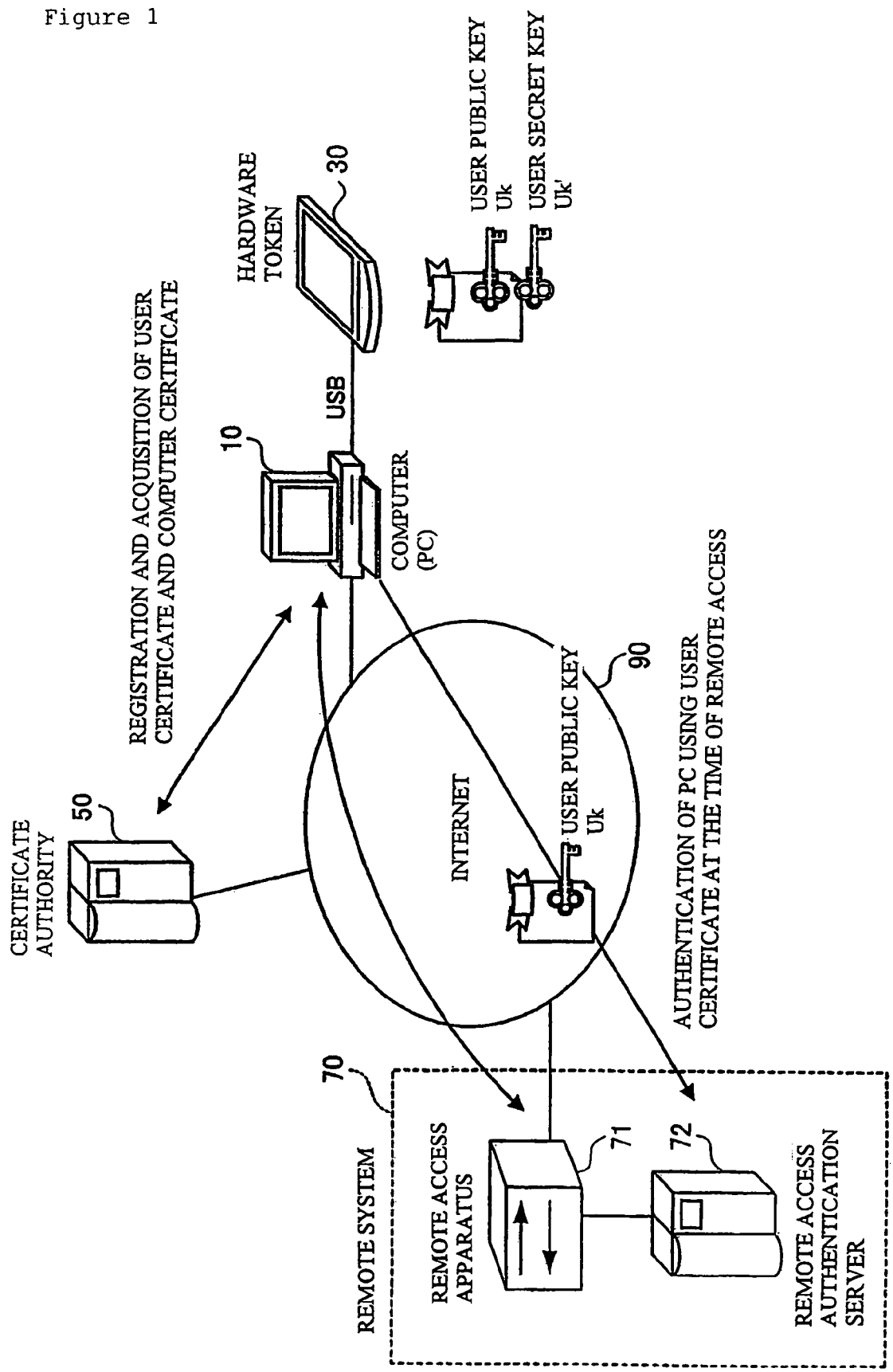
FIG. 1 is a diagram showing the overall configuration of a personal authentication system to which the present invention is applied in embodiments of the present invention (Embodiment 1 and Embodiment 2, or first and second embodiments).

Referring to FIG. 1, a diagram illustrates the overall configuration of an exemplary personal authentication system to which the first and second embodiments of the present invention may be applied.

Computer 10 is a client-side PC (personal computer) which makes remote accesses. Connected to PC 10 by, for example, a USB connection, is hardware token 30 for performing personal authentication with computer 10. Other units connected to computer 10 via Internet 90 include a certificate authority 50 for registration and acquisition of a user certificate and a computer certificate, and a remote system 70. Remote system 70 may comprise an intra-company system. Remote system 70 includes a remote access apparatus 71 connected to Internet 90 and capable of accessing, connecting and communicating to/from computer 10, and a remote access authentication server 72 which authenticates computer 10 by using a user certificate at the time of remote access. Each digital certificate, such as a user certificate, contains information such as a serial number, a name of the certificate authority 50 that has issued the certificate, an expiration date, a name of the owner (user), and a public key for the owner.

Hardware token 30, when inserted in an IC card reader/writer, is connected to the computer 10 via a USB (universal serial bus). A user public key Uk and a user secret key Uk' are stored in hardware token 30. Hardware token 30 may be one of IC cards collectively referred to as Smart Cards (trademark), a plastic card, a magnetic card, or an optical card. IC cards usable as hardware token 30 include contact-type cards, such as memory cards and microprocessor cards, and non-contact-type cards such as near-contact-type, proximate-type, vicinal-type and microware-type cards.

Certificate authority 50 is a third party agency which issues digital certificates and assures that a public key is authentic. Examples of certificate authorities 50 are Toriton, Inc. and VeriSign Japan K. K. Computer 10 makes an application to certificate authority 50 for registration of the user public key Uk and obtains a certificate for a user public key Uk from certificate authority 50. Computer 10 accesses the remote access authentication server 72 by using a user public key Uk stored in hardware token 30. At the time of this remote access, remote access authentication server 72 authenticates computer 10 by using a user certificate issued by the certificate authority 50, thus ensuring certain security.

When the user public key Uk stored in hardware token 30 is read out, permission to access hardware token 30 from the computer 10 is required. Conventionally, a password is used for this permission to access hardware token 30. In this embodiment, however, a combination of another digital certificate and a secret key other than the conventional password is used for access permission.

For example, a computer certificate can be used as the "another digital certificate" and "secret key combination" referred to therein. Presently, in Windows (trademark) systems and the like, a computer certificate can be issued for a subject for which a certificate is to be issued, as well as for an individual user. When authentication of a Smart Card using a computer certificate is performed, only the "rightful" user of a computer having a combination of this computer certificate and a secret key can access hardware token 30.

In this Embodiment 1, "rightful", as used herein, denotes in a narrow sense a particular computer 10 which may be used by a person to which a user certificate is issued.

In Embodiment 2, described below, "rightful" denotes a computer 10 in which a combination of a computer certificate, issued from a particular certificate authority 50, and a secret key is held.

However, the methods of both embodiments (Embodiment 1 and Embodiment 2), as also the conventional authentication based on the password method previously described, are in an orthogonal relationship with each other, and only the method of this embodiment may be used for authentication, or a combination also using the password method may be used for authentication.

Figure 2:
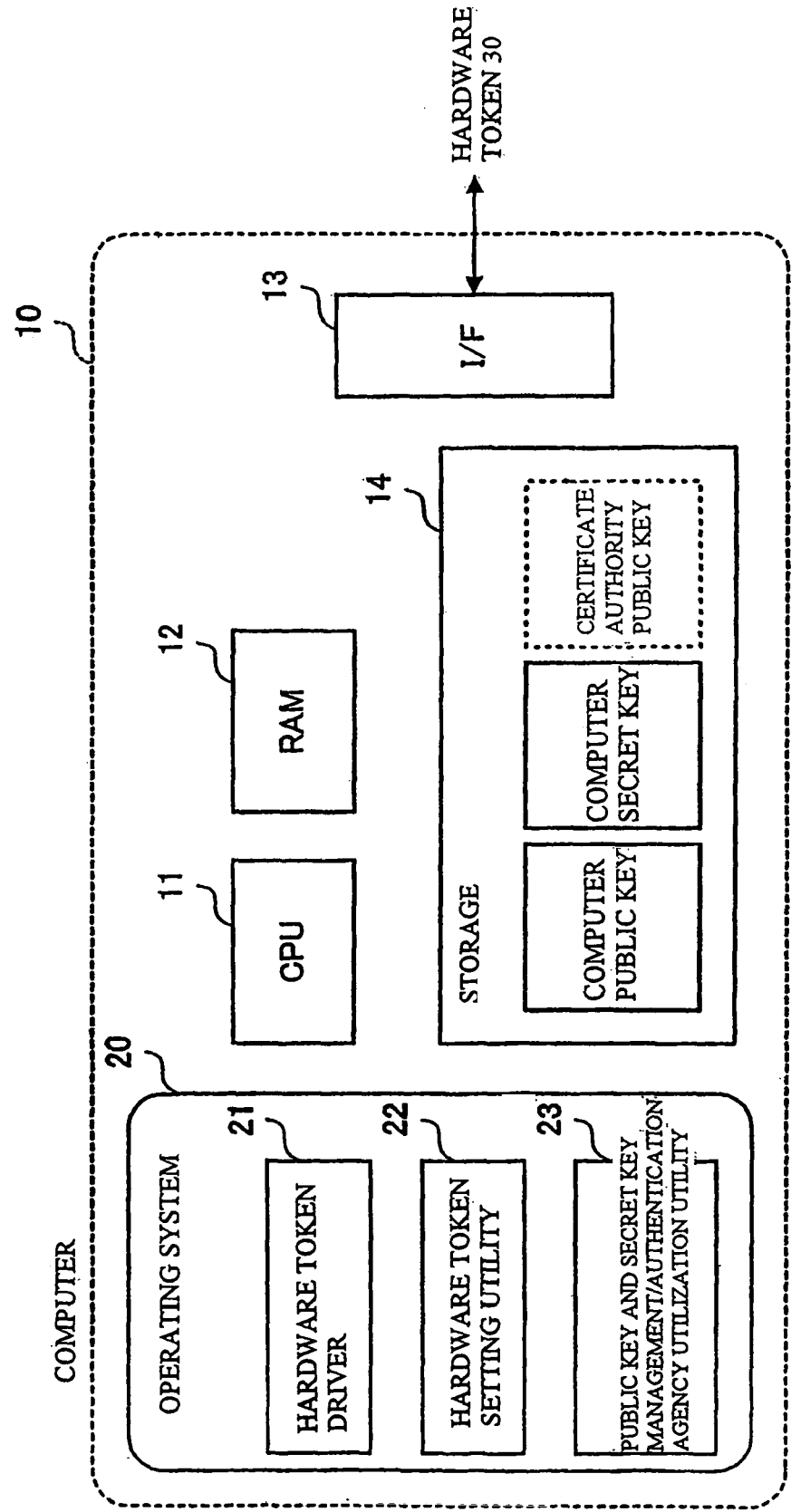
FIG. 2 is a block diagram showing the configuration (hardware and software) of a computer.

Referring to FIG. 2, a block diagram shows an exemplary embodiment of a hardware and software configuration of computer 10. Computer 10 includes central processing unit (CPU) 11 for controlling the operation of the computer, including executing various programs under the control of an operating system (OS) 20. Random access memory (RAM) 12 provides data and program storage for the CPU 11, and interface (I/F) 13 provides for communication with hardware token 30. Interface 13 comprises, for example, an IC card reader/writer if hardware token 30 is an IC card. Computer 10 also has persistent storage 14 including, for example, a read only memory (ROM) and an auxiliary read/write (R/W) storage such as a hard disk unit. A computer public key, a computer secret key and, if necessary, a certificate authority public key, are stored in storage 14.

Operating system 20 may be stored in the storage 14, and is loaded to RAM 12 by CPU 11 for execution. The operating system 20 thus operated is provided with a hardware token driver 21 which drives the hardware token 30, a hardware token setting utility 22, which includes software for setting hardware token 30, and a public key and secret key management/authentication agency utilization utility 23, which includes software instructions for managing a public key and a secret key and for utilizing the certificate authority 50.

Figure 3:
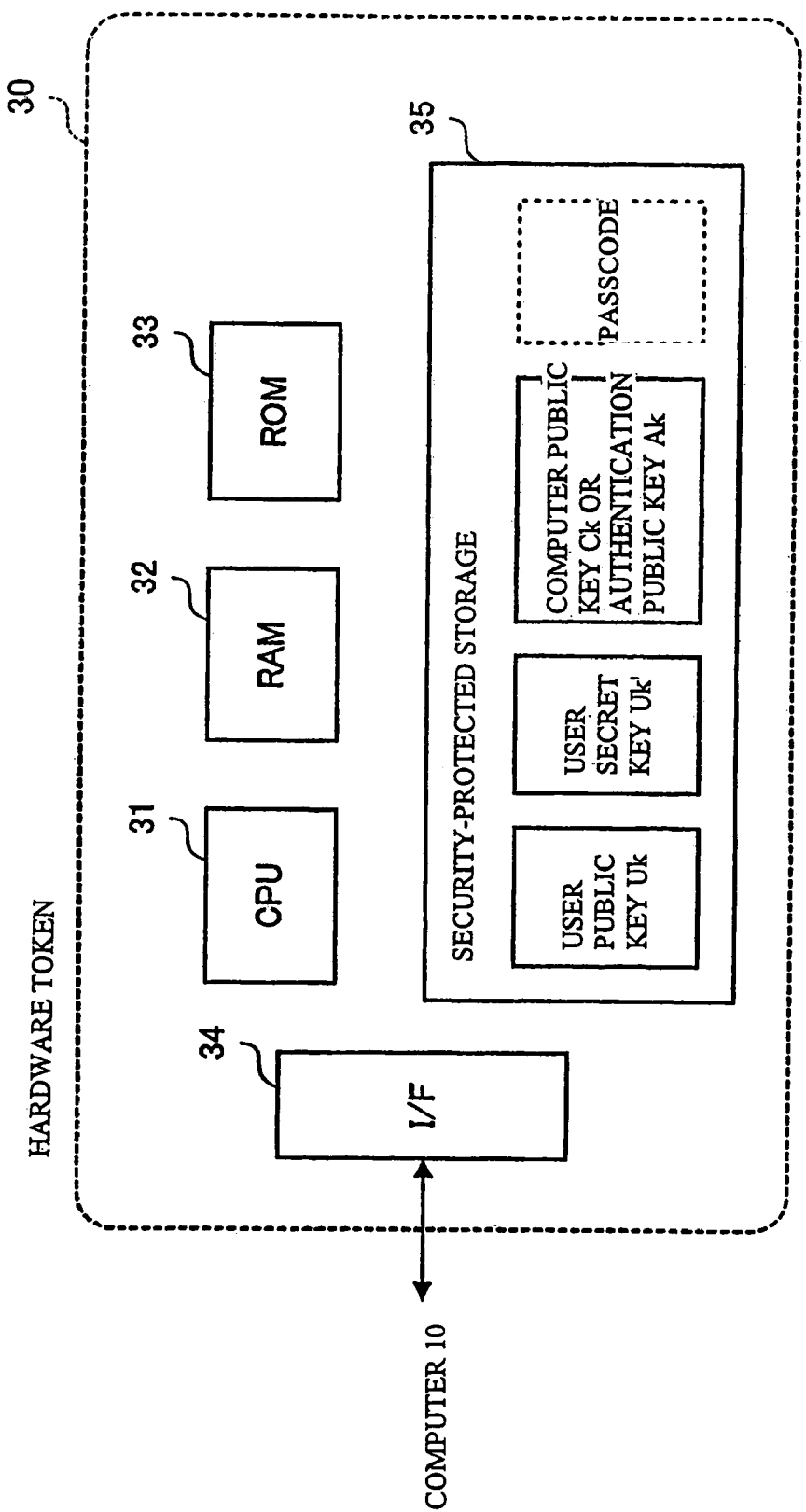
FIG. 3 is a block diagram showing the hardware configuration of the hardware token.

FIG. 3 is a block diagram showing an exemplary hardware configuration of hardware token 30. Hardware token 30 includes a CPU 31 for overall control, a RAM 32 which is a rewritable memory used as a work memory for the CPU 31, and a ROM 33 for storing a program executed in hardware token 30. Hardware token 30 also has an interface (I/F) 34 communicating with, for example, an IC card reader/writer connected to computer 10. Hardware token 30 also has a non-volatile memory 35, such as an EEPROM (electrically erasable programmable read-only memory), a flash memory or an FeRAM (ferro-electric random access memory) for providing security-protected storage. A user public key Uk, a user secret key Uk', and a computer public key Ck or a certificate authority public key Ak are stored in security-protected storage 35. A passcode used at the time of password setting may be also stored in the storage 35 if necessary.

Figure 4:
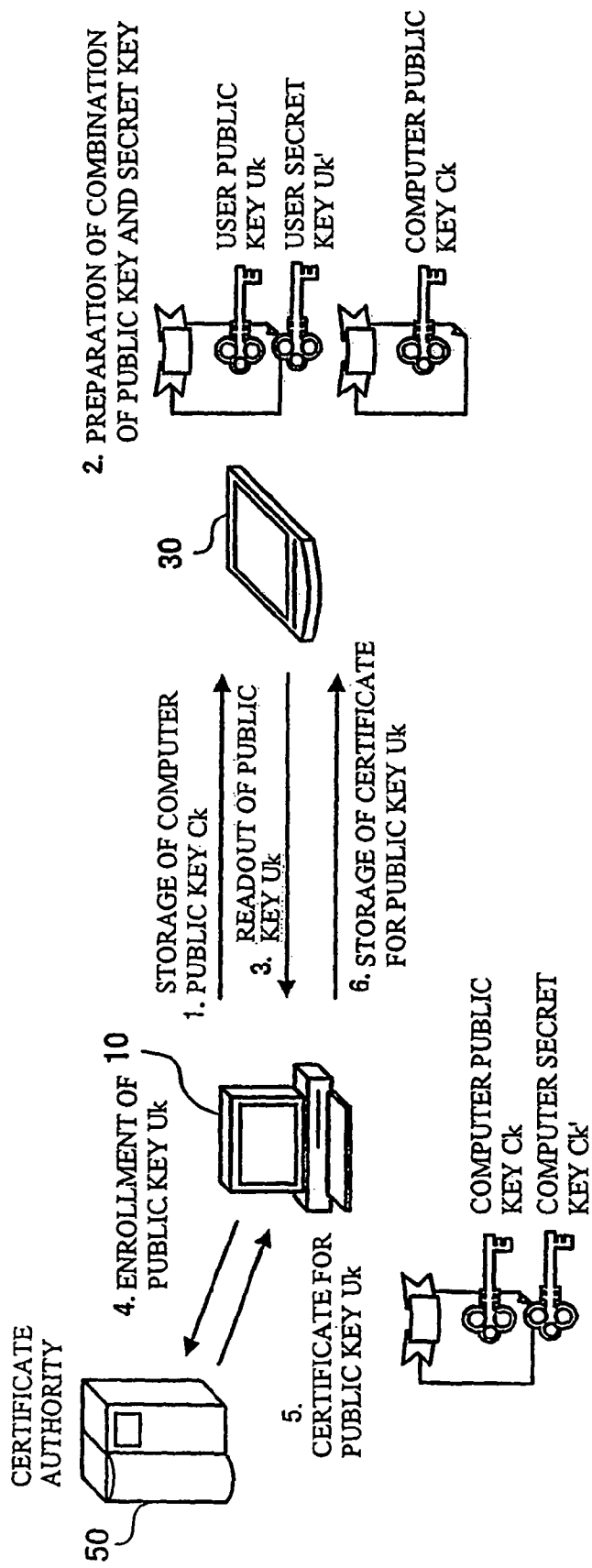
FIG. 4 is a diagram showing processing with respect to installation of a user certificate in accordance with the first embodiment of the invention.
Figure 7:
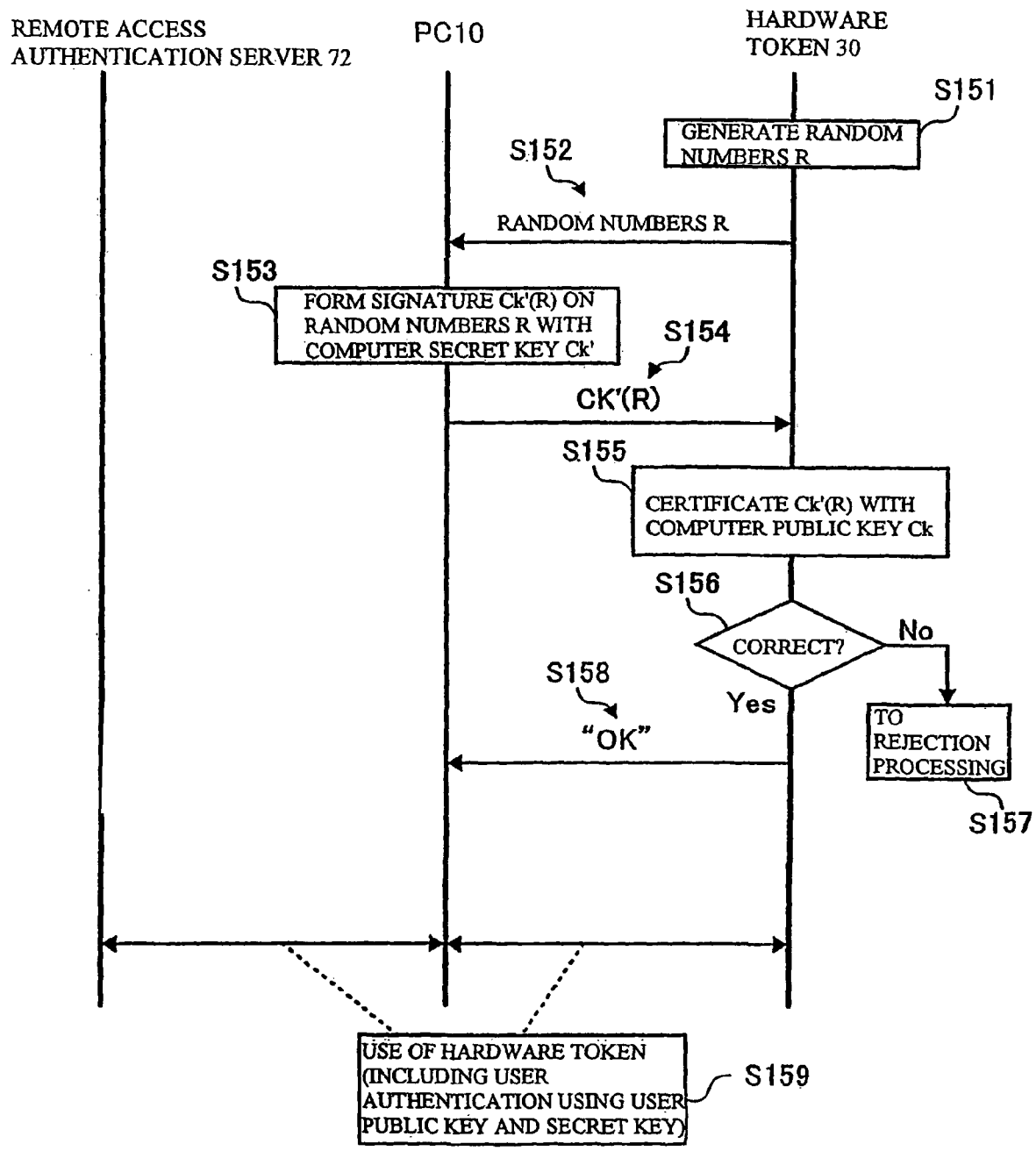
FIG. 7 is a control flowchart showing processing at the time of use of a user certificate shown in FIG. 5.

Referring to FIGS. 4 and 7, the method of personal authentication of Embodiment 1, using the above-described functional configuration, will be described.

In the following description, "user certificate Uk" refers to a user public key Uk authenticated in the certificate authority 50, "computer certificate Ck" to a computer public key Ck authenticated in certificate authority 50, and "certificate authority certificate Ak" to a certificate authority public key Ak authenticated in certificate authority 50.

FIG. 4 is a diagram outlining processing with respect to installation of a user certificate in accordance with Embodiment 1.

Referring to FIG. 4, in phase 1, computer 10 first stores a computer public key Ck in hardware token 30 and, in phase 3, reads out a user public key Uk stored in the memory of the hardware token 30. User public key Uk and a user secret key Uk' had previously, in phase 2, been prepared and stored in hardware token 30.

Computer 10 then, in phase 4, makes application to certificate authority 50 for registration of the user public key Uk and obtains a certificate for the user public key Uk from the certificate authority 50. Thereafter, in phase 5 computer 10 receives and in phase 6 stores user certificate Uk (which is the user public key Uk authenticated in the certificate authority 50) in hardware token 30. As described above, a computer certificate Ck for computer 10, which is usable by the user of hardware token 30, is also installed in hardware token 30 either during phase 6, when the user certificate Uk is installed, or previously.

Figure 5:
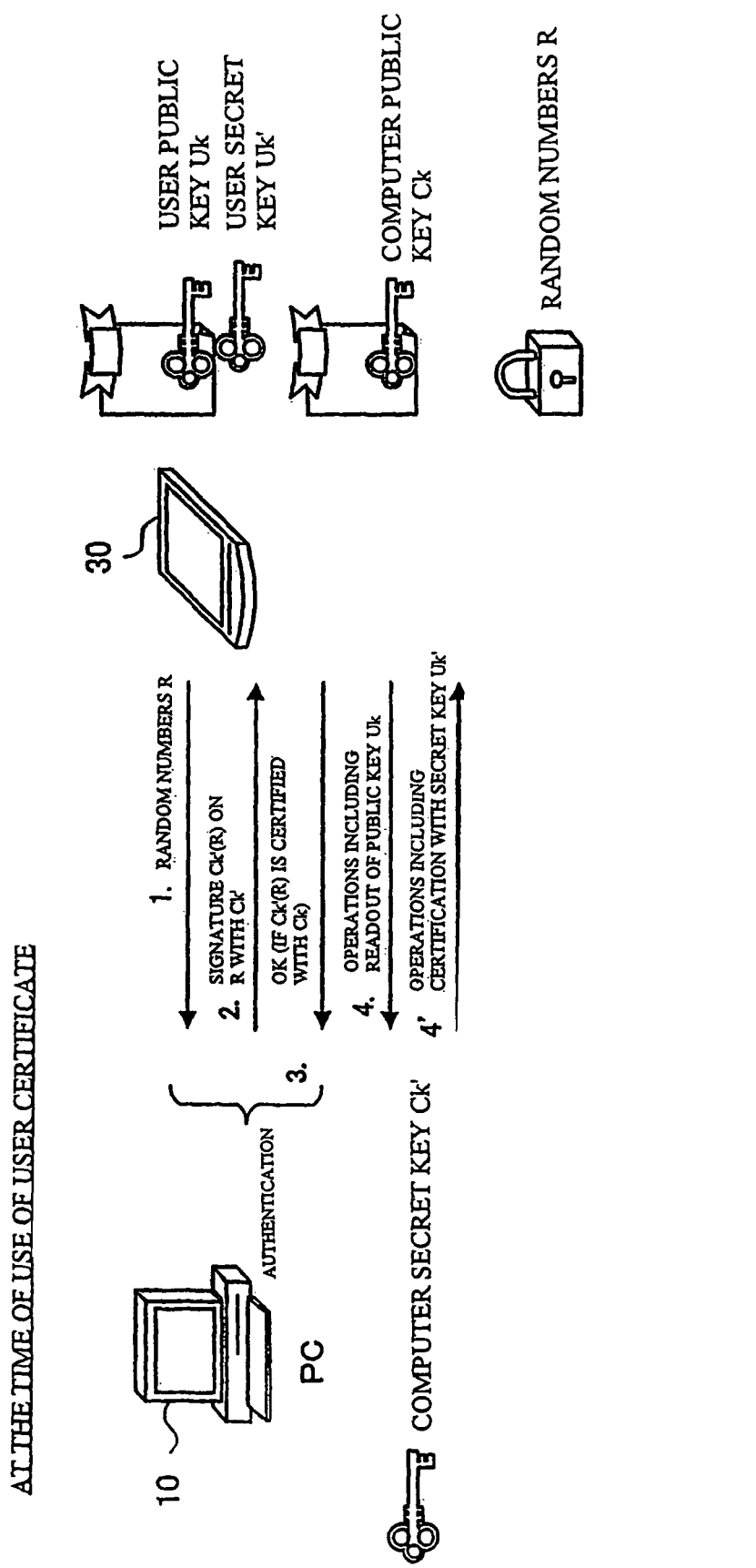
FIG. 5 is a diagram for showing processing with respect to use of a user certificate in the first embodiment.

FIG. 5 is a diagram for outlining processing with respect to use of a user certificate in Embodiment 1.

Referring to FIG. 5, in the first phase, random numbers R are generated from the hardware token 30 and are sent to computer 10. In phase 2, computer 10 sends back to the hardware token 30 a signature Ck'(R) formed on random numbers R with a computer secret key Ck'. Hardware token 30 certifies Ck'(R) with Ck and, in phase 3, permits computer 10 to make access thereto if Ck'(R) is correct. After being permitted to make access, computer 10 can perform operations including, in phase 4, readout of the user public key Uk from hardware token 30 and, in phase 4', certification with the user secret key Uk'.

Figure 6:
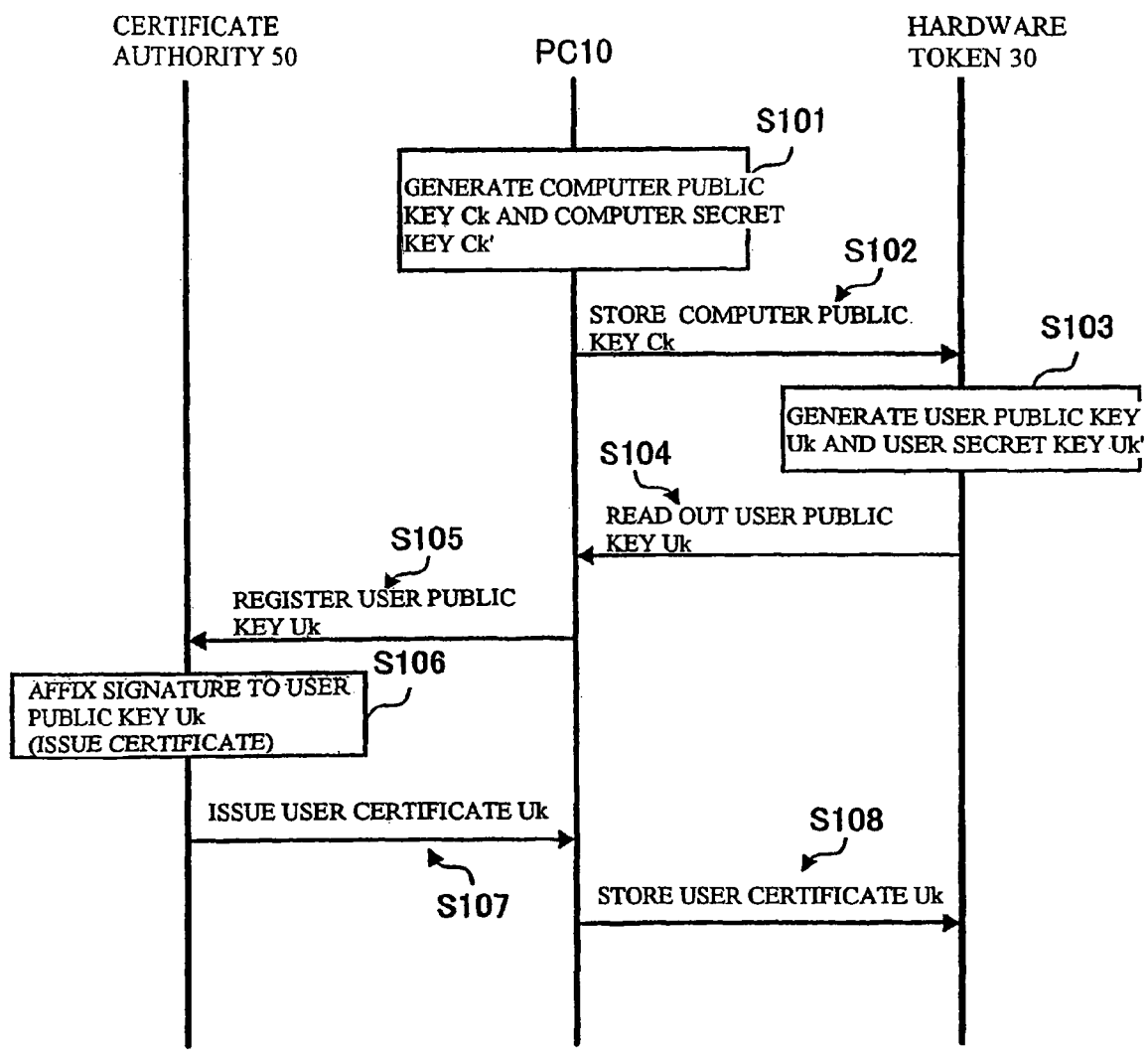
FIG. 6 is a control flow chart showing processing at the time of user certificate installation shown in FIG. 4.

FIG. 6 is a control flow chart showing processing at the time of user certificate installation shown in FIG. 4. Description will be made with reference to the block diagrams shown in FIGS. 2 and 3.

Referring to FIG. 6, in step 101, CPU 11 executes public key and secret key management/authentication agency utilization utility 23 to generate a computer public key Ck and a computer secret key Ck'

In step 102, hardware token setting utility 22 of computer 10 stores the computer public key Ck in security-protected storage 35 of hardware token 30 through interfaces 13 and 34 of computer 10 and hardware token 30, respectively.

In step 103, the CPU 31 of hardware token 30 generates a user public key Uk and a user secret key Uk' and stores the generated user public key Uk and user secret key Uk' in the security-protected storage 35 of hardware token 30.

In step 104, public key and secret key management/authentication agency utilization utility 23 of computer 10 reads out the user public key Uk from the hardware token 30 through the interfaces 13 and 34, and in step 105 makes application to certificate authority 50 for registration of the user public key Uk.

In step 106, certificate authority 50 affixes a signature to user public key Uk, and in step 107 issues user certificate for user public key Uk to computer 10. The hardware token setting utility 22 of computer 10 stores user certificate Uk (which is the user public key Uk after authentication by certificate authority 50) in the security-protected storage 35 of hardware token 30 through the interfaces 13, 34. Processing at the time of user certificate installation is thus completed.

Referring to FIG. 7 in connection with FIG. 5, processing at the time of use of a user certificate is as follows.

In step 151, the CPU 31 of hardware token 30 generates random number R, and in step 152 sends random number R to computer 10 through the interfaces (I/Fs) 13 and 34.

In step 153, computer 10 forms a signature Ck'(R) on the random number R with a computer secret key Ck'. In step 154, Ck'(R) is sent to the hardware token 30 through the I/Fs.

In step 155, the CPU 31 of hardware token 30 certifies Ck'(R) sent from the computer 10 with the computer public key Ck.

In step 156, CPU 31 determines by certification whether or not Ck'(R) is correct.

In step 157, if Ck'(R) is not correct, CPU 31 performs rejection processing. In step 158, if Ck'(R) is correct, CPU 31 informs computer 10 that Ck'(R) is correct (OK).

Thereafter, in step 159, in computer 10, user authentication (personal authentication) is performed by using the user public key Uk and the user secret key Uk' stored in the security-protected storage 35 of the hardware token 30 and various kinds of processing are executed. While authentication is performed in the remote access authentication server 72, hardware token 30 provides computer 10 with information (Uk'(R')) prepared for user authentication on the basis of the user public key Uk, the user secret key Uk' and random numbers R' provided from remote access authentication server 72. In computer 10, operations including remote access to remote access authentication server 72 shown in FIG. 1 are executed by using the information (Uk'(R')).

According to Embodiment 1, as described above, only the computer 10 having the computer secret key Ck' corresponding to the computer public key Ck stored in the hardware token 30 can access the hardware token 30. Thus, the level of security against unauthorized use of the hardware token 30 can be improved. While the description has been made by assuming that only one computer certificate Uk is used for ease of explanation, a plurality of computer certificates may be used.

Embodiment 2

In Embodiment 1, only a particular authorized computer 10 can use hardware token 30. In Embodiment 2, this use is expanded so all computers 10 authenticated with a public key of certificate authority 50 can use hardware token 30. The same functions, as those previously described for Embodiment 1 are represented by the same characters, and the detailed description of them will not be repeated.

Figure 8:
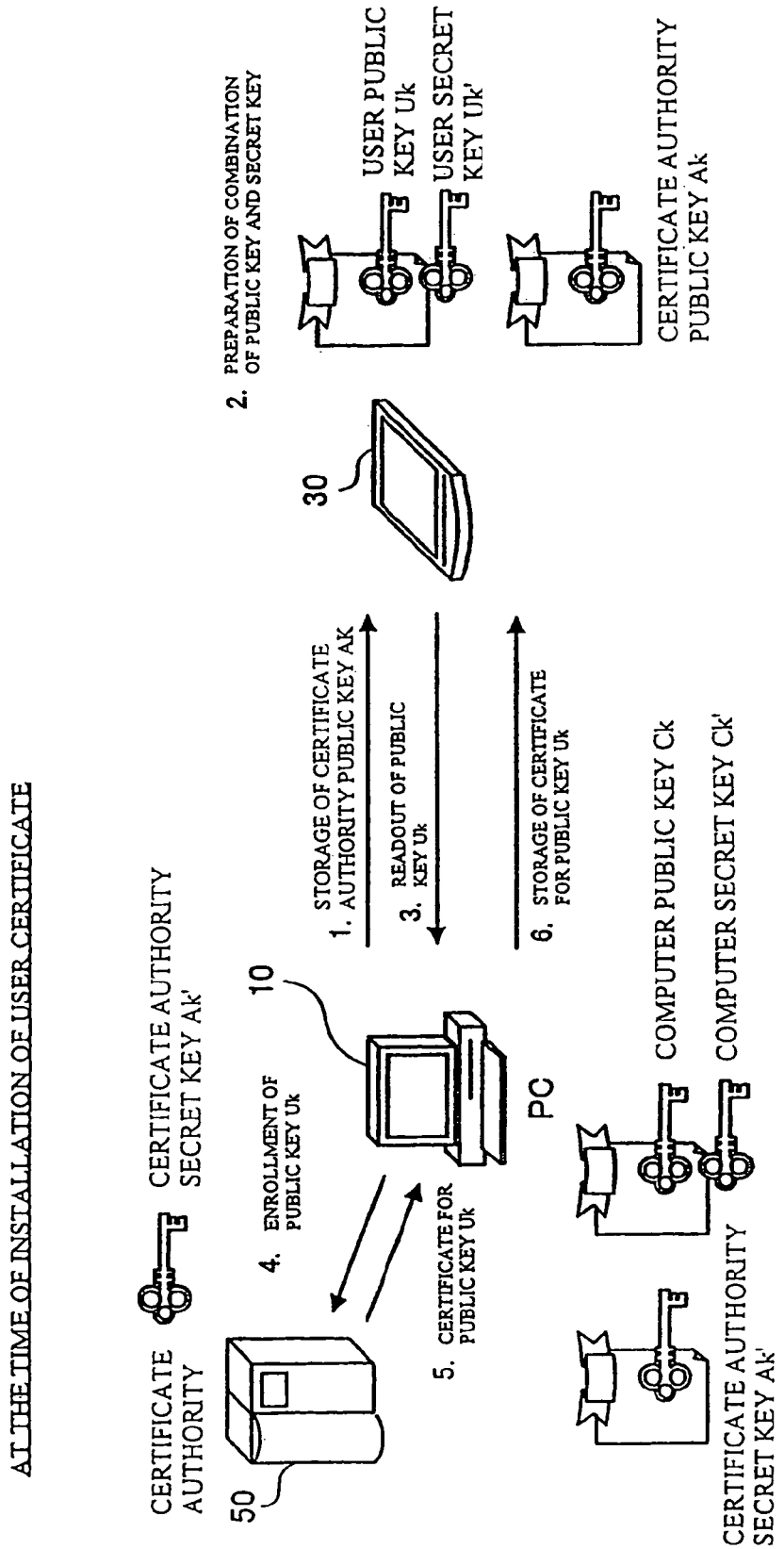
FIG. 8 is a diagram showing processing with respect to installation of a user certification in the second embodiment.

Referring to FIG. 8, the process for installing a user certification in accordance with Embodiment 2 is set forth.

Prior to the phases represented in FIG. 8, computer 10 had made application to certificate authority 50 for registration of a computer public key Ck and had received back a certificate for the computer public key Ck and a pubic key Ak (certificate authority public key Ak) issued by certificate authority 50.

In phase 1, computer 10 stores the certificate authority public key Ak in hardware token 30. In phase 2, hardware token 30 forms a combination of a user public key Uk and a user secret key Uk'. In phase 3, computer 10 reads out the user public key Uk from the hardware token 30, in phase 4 enrolls the public key Uk by applying to certificate authority 50 for registration of that user public key Uk, and in phase 5 obtains a certificate for the user public key Uk from certificate authority 50. In phase 6, computer 10 stores the certificate for the user public key Uk in the hardware token 30.

In this manner, when a certificate for a user public key Uk is installed in hardware token 30, or before the certificate for a user public key Uk is installed in the hardware token 30, a certificate authority public key Ak, authenticated by a certificate authority 50 in which a computer public key Ck has previously been authenticated, is installed in a computer (or, by the same process, in a plurality of computers) 10 for access by a user of hardware token 30.

Figure 9:
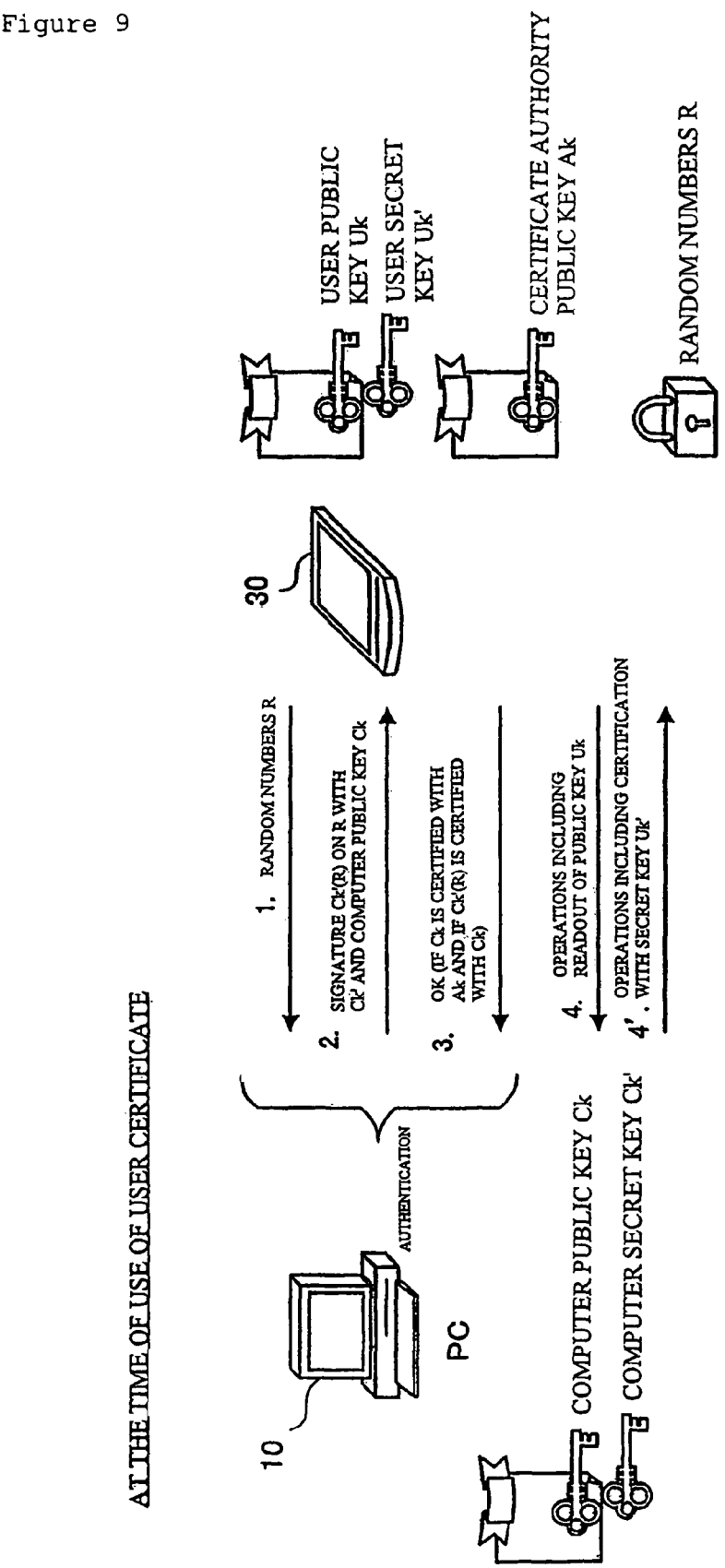
FIG. 9 is a diagram showing processing with respect to use of a user certificate in the second embodiment.

Referring to FIG. 9, a process for using a user certificate in accordance with Embodiment 2, is described.

In phase 1, random number R is generated by hardware token 30 and sent to computer 10. Computer 10 forms a signature Ck'(R) on the random number R with a computer secret key Ck' and in phase 2 sends Ck'(R) to hardware token 30 together with a computer certificate (including computer public key Ck).

Hardware token 30 certifies Ck by using the certificate authority public key Ak authenticated in the certificate authority 50. If Ck is correct, then the hardware token 30 certifies Ck'(R) by using Ck. If Ck'(R) is correct, in phase 3, hardware token 30 permits the computer 10 to make access thereto. After being permitted to make access, computer 10 can perform operations including, in phase 4, readout of the user public key Uk from the hardware token 30 and, in phase 4', certification with the user secret key Uk'.

Figure 10:
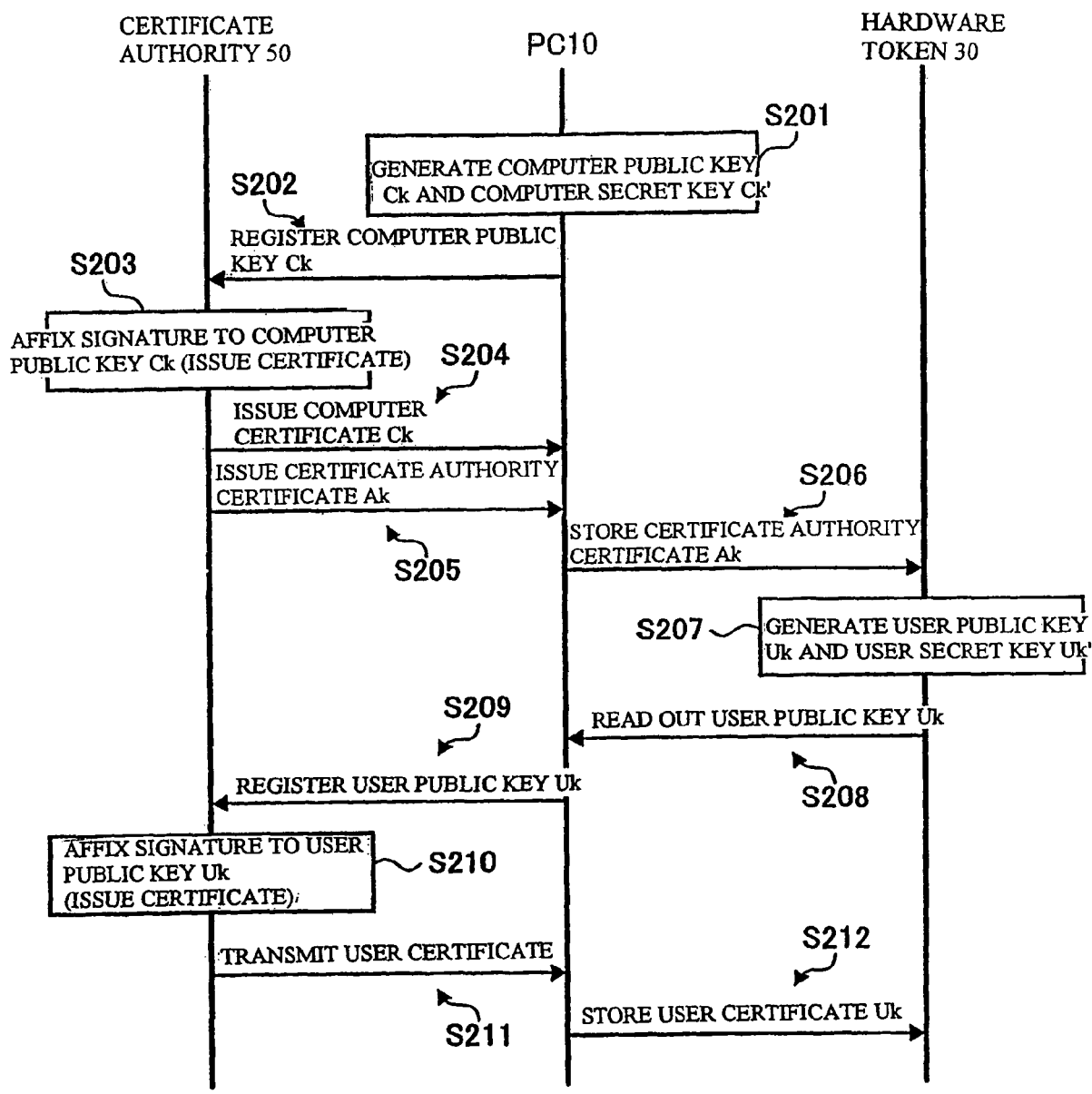
FIG. 10 is a control flow chart showing processing at the time of user certificate installation shown in FIG. 8.

Referring to FIG. 10 in connection with FIGS. 2, 3, and 8, processing at the time of user certificate installation will be described.

In step 201, public key and secret key management/authentication agency utilization utility 23 is executed by the CPU 11 of computer 10 to generate a computer public key Ck and a computer secret key Ck', and in step 202 makes application to authentication authority, or section, 50 for registration of the computer public key Ck.

In step 203, a signature is affixed to the computer public key Ck in authentication section 50, and in step 204 a certificate for the computer public key Ck is issued from the authentication section 50 to the computer 10. Also, in step 205, a certificate authority certificate Ak authenticated in the certificate authority 50 is issued from the certificate authority 50 to computer 10.

In step 206, the hardware token setting utility 22 of computer 10 stores the certificate authority certificate Ak, which has been authenticated by certificate authority 50, in the security-protected storage 35 of hardware token 30 through the I/Fs (the interface 13 of the computer 10 and the interface 34 of the hardware token 30).

In step 207, the CPU 31 of hardware token 30 generates a user public key Uk and a user secret key Uk' and stores the generated user public key Uk and user secret key Uk' in the security-protected storage 35 of hardware token 30.

In step 208, the public key and secret key management/authentication agency utilization utility 23 of computer 10 reads out the user public key Uk from hardware token 30 through the I/Fs, and in step 209 makes application to the certificate authority 50 for registration of the user public key Uk.

In step 210, a signature is affixed to the user public key Uk by certificate authority 50, and in step 211, a user certificate Uk for the user public key Uk is issued (transmitted) to computer 10.

In step 212, the hardware token setting utility 22 of computer 10 stores the user certificate Uk authenticated in the certificate authority 50 in the security-protected storage 35 of hardware token 30 through the I/Fs. Processing at the time of user certificate installation is thus completed.

Figure 11:
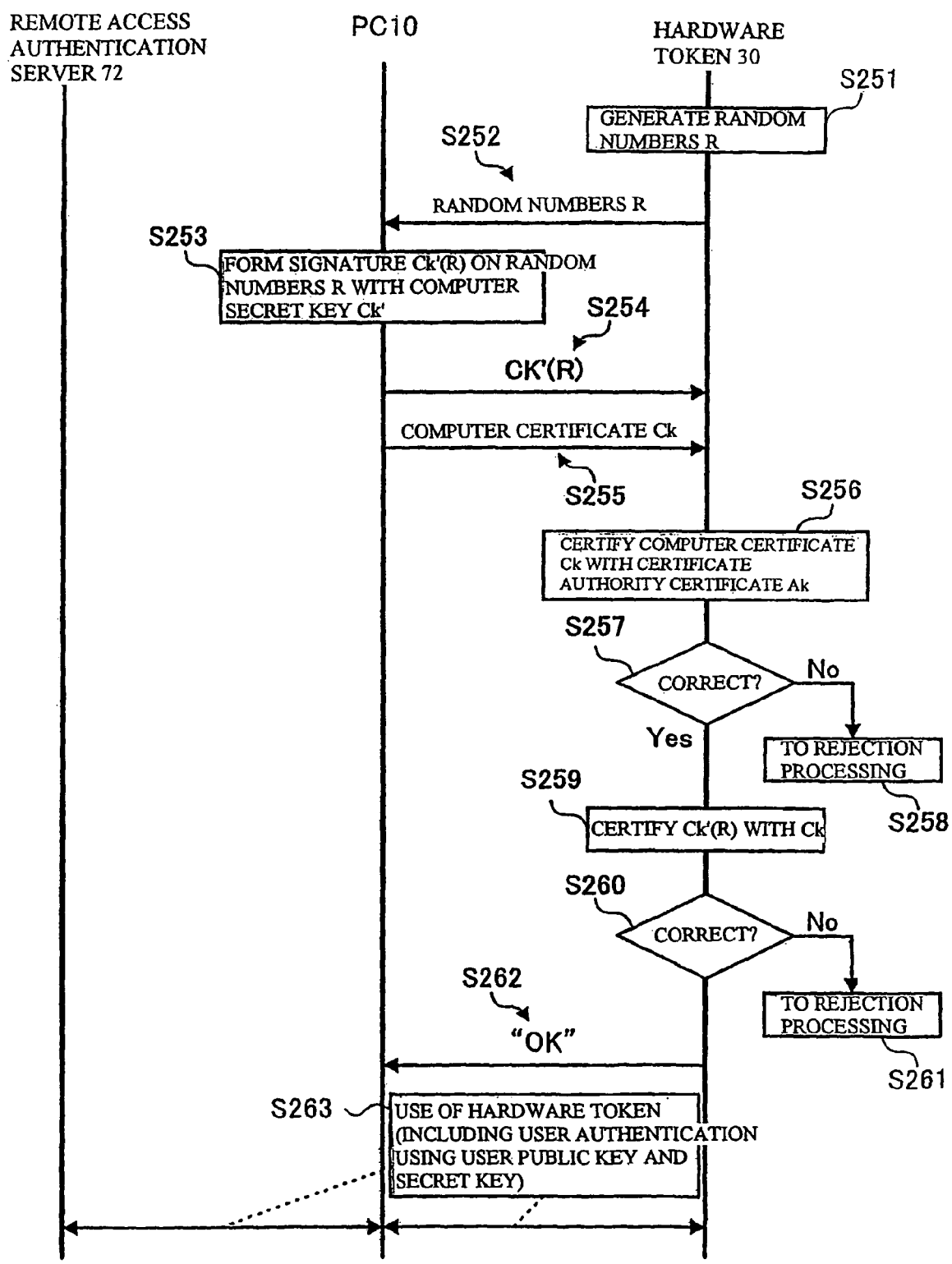
FIG. 11 is a control flowchart showing processing at the time of use of a user certificate shown in FIG. 9.
Figure 12:
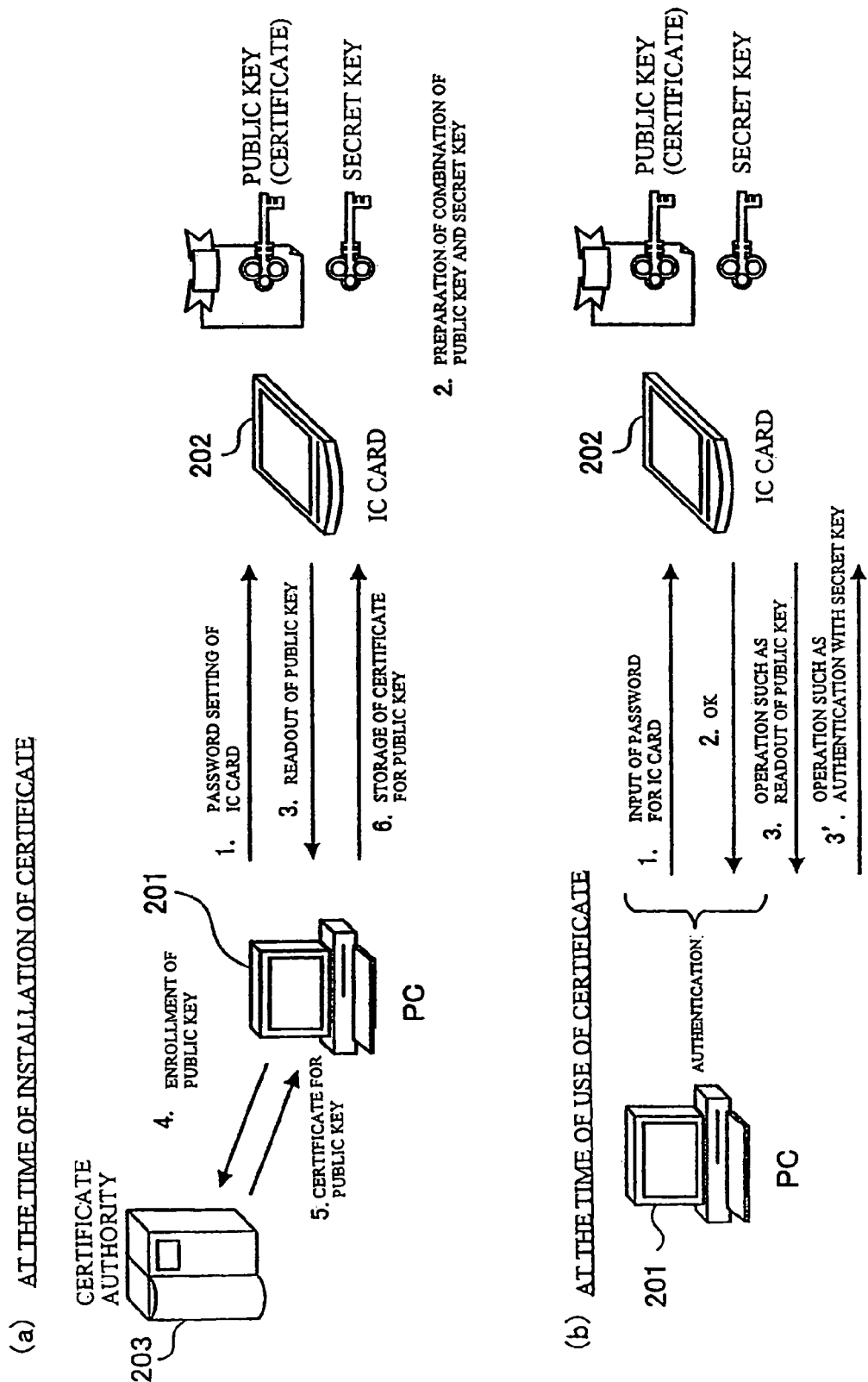
FIGS. 12(a) and 12(b) are diagrams illustrating a conventional password authentication method using an IC card.

Referring to FIG. 11 in connection with FIG. 9, a description will be given of processing at the time of use of a user certificate.

In step 251, the CPU 31 of hardware token 30 generates random number R, and in step 252 sends the random number R to computer 10 through the I/Fs (the interface 34 of the hardware token 30 and the interface 13 of the computer 10).

In step 253, computer 10 forms a signature Ck'(R) on the random number R with a computer secret key Ck', and in step 254 the generated Ck'(R) is sent to hardware token 30 through the I/Fs. Simultaneously, in step 255, the computer public key Ck (computer certificate Ck) authenticated in the certificate authority 50 is also sent to hardware token 30.

In step 256, the CPU 31 of the hardware token 30 certifies the Ck sent from computer 10 by using the certificate authority public key Ak stored in security-protected storage 35.

In step 257, the hardware token determines by certification whether or not Ck is correct. If Ck is not correct, in step 258, rejection processing is performed. If Ck is correct, in step 259, the Ck'(R) sent from the computer 10 is certified with this Ck.

In step 260, determination is made as to whether or not Ck'(R) is correct. If Ck'(R) is not correct, in step 261 rejection processing is performed. If Ck'(R) is correct, in step 262 information indicating that Ck'(R) is correct is sent to the computer 10. Thereafter, in step 263, user authentication (personal authentication) is performed in computer 10 by using the user public key Uk and the user secret key Uk' stored in the security-protected storage 35 of the hardware token 30 and various additional processing is executed. While authentication is performed in the remote access authentication server 72, hardware token 30 provides computer 10 with information (Uk'(R')) prepared for user authentication on the basis of the user public key Uk and the user secret key Uk'. In computer 10, operations including remote access to the remote access authentication server 72 shown in FIG. 1 are executed by using the information (Uk'(R')).

According to Embodiment 2, as described above, the computer public key Ck is recognized as correct when the computer public key Ck is certified with the certificate authority public key Ak, and certification is performed by using the computer public key Ck, thus enabling a computer 10 having a correct computer public key Ck authenticated in the certificate authority 50 and a computer secret key Ck' to access hardware token 30.

In the above manner, the level of security against unauthorized use of the hardware token 30 is improved. Also, the hardware token 30 can be used with a plurality of computers 10 authenticated in a particular certificate authority 50, thus achieving a large improvement in convenience. While it is assumed that only one certificate authority certificate Ak (certificate authority public key Ak authenticated in the above-described station 50) exists, a plurality of certificate authority public keys Ak may exist with no problem.

While this second embodiment has been described with respect to a case where a computer public key Ck and a computer secret key Ck' are generated in computer 10, the certificate authority 50 may directly generate keys of these kinds and issue certificates for them in some case. Also, while this embodiment has been described with respect to a case where a user public key Uk and a user secret key Uk' are generated in the hardware token 30, the certificate authority 50 may generate keys of these kinds in other cases.

In this second embodiment, as described above, not a password but a combination of another digital certificate (a public key authenticated in certificate authority 50) and a secret key is used as the authentication means for authorizing or permitting access to hardware token 30, thereby enabling identification of a computer 10 permitted to use the hardware token 30. Thus, an authorized use of hardware token 30 can be inhibited and the security of the system can be effectively improved.

Good use of the present invention can be made, for example, in various computers such as notebook PCs and desktop PCs, as also in hardware tokens such as IC cards, and network systems using such computers and hardware tokens. Also, good use of the present invention can be made, for example, as a program executed in such computers.

ADVANTAGE OF THE INVENTION

It is an advantage of the present invention that a combination of a digital certificate and a secret key is used to authenticate access to a hardware token to effectively improve the level of security against unauthorized access when a hardware token is used.

SUMMARY OF SYMBOLS AND COMPUTATIONS

10 Computer (PC)
11 CPU
12 RAM
13 Interface (I/F)
14 Storage
20 Operating system (OS)
21 Hardware token driver
22 Hardware token setting utility
23 Public key and secret key management/authentication agency utilization utility
30 Hardware token
31 CPU
32 RAM
33 ROM
34 Interface (I/F)
35 Security-protected storage
50 Certificate authority
70 Remote system
71 Remote access apparatus
72 Remote access authentication server
90 Internet
Uk User public key. Also, user key certificate (the user public key as authenticated by certificate authority 50)
Ck Computer public key. Also, computer key certificate (the computer public key as authenticated by certificate authority 50)
Ck' Computer secret key
Ak Authority public key. Also, authority public key certificate (the authority public key as authenticated by certificate authority 50)
R Random number generated by token
R' Random number generated by authentication server
Ck'(R) A signature on random number R using computer secret key Ck'
Uk'(R') A signature on random number R' provided from an authentication server, formed from a user secret key Uk'

Creation of a certificate from a user public key may be made by a certificate authority by signning Uk and its subject using the secret key Ak' of the certificate authority. Signning means the mathematical calculation Uk+Subject+Enc(MD(Uk+Subject), Ak'), where + is a concatenation function, Subject is additional information for the certificate, MD is a message digest function such as SHA, and Enc(X, Y) is a function to encrypt X using key Y based on a public key encryption algorithm such as RSA.

Creation of a signature Ck'(R) formed on random numbers R with a computer secret key Ck', may be calculated as Enc(MD(R), Ck'), where MD is a message digest function such as SHA, and Enc is a public key encryption algorithm such as RSA.

Creation of a certificate authority public key Ak is generated during initial installation of a certificate authority. A system administrators generates a key pair including the public key Ak and the secret key Ak', according to a public key encryption algorithm such as RSA.

Authenticating a signature Ck'(R) with public key Ck involves previously calculating MD(R), where MD is a message digest function, and then, to authenticate Ck'(R), calculate Dec(Ck'(R), Ck), where Dec(X, Y) is a function to decrypt X using key Y based on a public key encryption algorithm. If MD(R) and Dec(Ck'(R), Ck) is the same, it is authenticated. If it is not the same, authentication fails.

Forming Uk'(R') on the basis of user secret key Uk' and random number R' is done by determining Enc(MD(R'), Uk'), where MD is a message digest function, Enc(X, Y) is a function to encrypt X using key Y based on a public key encryption algorithm.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

I claim:

1. A method for using a hardware token connected to a computer, said method comprising the steps of:
    storing a computer public key Ck for said computer in said hardware token, wherein a user public key Uk, a user secret key Uk', and the computer public key Ck are stored in said hardware token and are received from said computer;
    sending a random number R, generated by said hardware token, to said computer;
    responsive to receiving a signature Ck'(R) formed by said computer using the random number R, determining, by said hardware token, whether the signature Ck'(R) corresponds to the computer public key Ck stored in said hardware token; and
    responsive to a determination that the signature Ck'(R) corresponds to the computer public key Ck, allowing, by said hardware token, said computer to access said hardware token.

2. The method according to claim 1, wherein said hardware token is an integrated circuit (IC) in which said user public key Uk and said user secret key Uk' are stored.

3. The method of claim 1 further comprising:
    registering, by said computer, said user public key Uk from said computer with a certificate authority after reading out said user public key Uk;
    receiving, by said computer, from said certificate authority at said computer a certificate issued with respect to said user public key Uk and storing in said computer said certificate; and
    storing, by said computer, said certificate for said user public key Uk in said hardware token in response to storing said certificate in said computer.

4. The method of claim 1 further comprising:
    storing another computer public key for another computer in said hardware token.

5. The method of claim 1, wherein the step of storing, by said computer, the computer public key Ck for said computer in said hardware token comprises:
    storing, by said computer, a certificate for the computer public key Ck for said computer in said hardware token, wherein the certificate includes the computer public key Ck.

6. The method of claim 1, wherein the allowing step comprises:
    reading out from said hardware token one of said user public key Uk and a user public key certificate.

7. The method of claim 1, wherein the allowing step comprises:
    receiving, by said hardware token, a request from said computer for a signature Uk'(R');
    generating, by said hardware token, the signature Uk'(R') using a random number R' and the user secret key Uk'; and
    sending, by said hardware token, the signature Uk'(R'), to said computer.

8. The method of claim 1, wherein the allowing step further comprises:
    establishing a connection, by said computer, to a remote access authentication server;
    receiving, by said computer, a random number R' generated by the remote access authentication server over the connection;
    receiving, by said computer, a request from the remote access authentication server over the connection for a signature Uk'(R');
    sending, by said computer, a request to said hardware token to generate the signature Uk'(R') using the random number R' received from the remote access authentication server and a user secret key Uk' stored on said hardware token; and
    responsive to receiving the signature Uk'(R') from said hardware token, said computer sending the signature Uk'(R') to the remote access authentication server.

9. The method of claim 1 further comprising:
    sending, by said hardware token, the user public key Uk to said computer;
    receiving, by said hardware token, a user public key certificate from said computer, wherein the user public key certificate is generated using the user public key Uk; and
    storing, by said hardware token, the user public key certificate in said hardware token, wherein the user public key certificate includes a name of the owner of the user public key certificate and wherein the name of the owner is a name of a user of sad hardware token.

10. The method of claim 1, wherein only said computer having a computer secret key Ck' corresponding to the computer public key Ck stored in said hardware token is allowed access to said hardware token and wherein access to said hardware token occurs without using a password.

11. A hardware token configured for physical connection to a computer, said hardware token comprising:
    a CPU;
    a computer readable memory;
    a computer readable storage media for storing a computer public key Ck obtained from said computer, a user public key Uk, and a user secret key Uk', each used for authentication of personal identification;
    first program instructions for providing to said computer said user public key Uk stored in said computer readable storage media in response to receiving a signature Ck' (R) corresponding to the computer public key Ck, wherein the signature Ck'(R) is generated using a random number R generated by the CPU;

second program instructions for obtaining from said computer a certificate for said user public key Uk issued from a certificate authority with respect to said user public key Uk; and third program instructions for storing said certificate for said user public key Uk in said computer readable storage media, wherein said first program instructions, said second program instructions, and said third program instructions are stored in said computer readable storage media for execution by said CPU via said computer readable memory.

12. A hardware token used by being connected to a computer, said hardware token comprising:
  a CPU;
  a computer readable memory;
  a computer readable storage for storing a user public key Uk and a user secret key Uk', said user public key Uk and said user secret key Uk' each used for authentication of personal identification;
  first program instructions for providing to a first computer said user public key Uk stored in said computer readable storage;
  second program instructions for obtaining from said first computer a certificate for said user public key Uk issued from a certificate authority with respect to said user public key Uk;
  third program instructions for storing said certificate for said user public key Uk, wherein said user public key Uk is provided to said first computer in response to receiving a signature Ck'(R) corresponding to computer public key Ck, wherein the signature Ck'(R) is generated using a random number R generated by said CPU; and
  fourth program instructions for obtaining from said first computer and storing a certificate for a public key Ak issued by said certificate authority in said computer readable storage, wherein said first program instructions, said second program instructions, said third program instructions, and said fourth program instructions are stored in said computer readable storage for execution by said CPU via said computer readable memory.

13. A computer which performs authentication of personal identification by using a hardware token, said computer comprising:
  a CPU;
  a computer readable memory;
  a computer readable storage for storing in said hardware token a computer public key Ck;
  first program instructions for reading out a user public key Uk stored in said hardware token using a computer secret key signature Ck'(R) corresponding to the computer public key Ck stored in said hardware token, wherein the signature Ck'(R) is generated using a random number R generated by said CPU;
  second program instructions for registering said user public key Uk in a certificate authority and receiving a certificate issued from said certificate authority with respect to said user public key Uk; and
  certificate storage for storing in said hardware token said certificate of said user public key Uk received by said second program instructions, wherein the first program instructions and said second program instructions are stored in said computer readable storage for execution by said CPU via said computer readable memory.

14. A computer program product for authenticating personal identification by using a hardware token connected to a computer, said computer program product comprising:
  a computer readable storage medium for storing program instructions configured for execution on said computer;
  first program instructions to store a computer public key Ck of said computer in said hardware token;
  second program instructions to read out a user public key Uk stored in said hardware token in response to receiving a signature Ck'(R) corresponding to the computer public key Ck of said computer stored in said hardware token, wherein the signature Ck' (R) is generated using a random number R generated by said hardware token;
  third program instructions to register, by said computer, said user public key Uk in a certificate authority after reading out said user public key Uk and receive at said computer a certificate issued from said certificate authority with respect to said user public key Uk; and
  fourth program instructions to store said certificate of said user public key Uk in said hardware token in response to storing said certificate in said computer; and wherein said first, second, third, and fourth program instructions are recorded on said computer readable storage medium and configured for execution by said computer.

15. A method for using a hardware token connected to a computer, said method comprising the steps of:
  storing a certificate for a public key Ak for said computer, a user public key Uk, and a user secret key Uk' in said hardware token;
  sending a random number R, generated by said hardware token, to said computer;
  responsive to receiving a computer public key Ck from said computer, determining, by said hardware token, whether the computer public key Ck corresponds to the certificate for the public key Ak stored in said hardware token;
  responsive to receiving a signature Ck'(R) generated by said computer using the random number R, determining, by said hardware token, whether the signature Ck'(R) corresponds to the computer public key Ck; and
  responsive to a determination that the computer public key Ck corresponds to the certificate for the public key Ak and a determination that the signature Ck'(R) corresponds to the computer public key Ck, allowing, by said hardware token, said computer to access said hardware token.

16. The method of claim 15, wherein only said computer having the computer public key Ck corresponding to the certificate for the public key Ak stored in said hardware token and having a computer secret key Ck' corresponding to the certificate for the public key Ak stored in said hardware token is allowed to access said hardware token, and wherein access to said hardware token occurs without using a password.

* * * * *